US 11,974,558 B2
May 7, 2024

(12) United States Patent
Nilsen et al.

(54) STAR DRAG FISHING REEL

(71) Applicant: Accurate Grinding and Mfg. Corp., Corona, CA (US)

(72) Inventors: David Nilsen, Coto de Caza, CA (US); Douglas Nilsen, Laguna Hills, CA (US)

(73) Assignee: Accurate Grinding and Mfg. Corp., Corona, CA (US)

( * ) Notice: Subject to any disclaimer, the term of this patent is extended or adjusted under 35 U.S.C. 154(b) by 0 days.

(21) Appl. No.: 17/827,378

(22) Filed: May 27, 2022

(65) Prior Publication Data

US 2023/0189778 A1 Jun. 22, 2023

Related U.S. Application Data

(60) Provisional application No. 63/292,401, filed on Dec. 21, 2021.

(51) Int. Cl.
*A01K 89/033* (2006.01)

(52) U.S. Cl.
CPC .......... *A01K 89/058* (2015.05); *A01K 89/047* (2015.05)

(58) Field of Classification Search
CPC .... A01K 89/02; A01K 89/027; A01K 89/028; A01K 89/033; A01K 89/045; A01K 89/046; A01K 89/047; A01K 89/05; A01K 89/057; A01K 89/058; A01K 89/0187; A01K 89/0188; A01K 89/01903; A01K 89/01909
USPC ........................................................ 242/285
See application file for complete search history.

(56) References Cited

U.S. PATENT DOCUMENTS

| | | | | |
|---|---|---|---|---|
| 4,648,566 A * | 3/1987 | Furomoto | .......... | A01K 89/0189 242/258 |
| 5,356,090 A * | 10/1994 | Sato | .................. | A01K 89/0155 188/185 |
| 5,803,385 A * | 9/1998 | Baisch | ............... | A01K 89/0155 188/185 |
| 6,364,230 B1 * | 4/2002 | Kawasaki | .......... | A01K 89/0155 188/185 |
| 6,460,793 B1 * | 10/2002 | Hirayama | ........ | A01K 89/01928 242/321 |
| 6,474,580 B1 * | 11/2002 | Hirayama | ........ | A01K 89/01557 188/181 A |

(Continued)

FOREIGN PATENT DOCUMENTS

JP       2572100 Y2 *  5/1998
KR    20090014961 A  *  2/2009

*Primary Examiner* — Michael R Mansen
*Assistant Examiner* — Henrix Soto
(74) *Attorney, Agent, or Firm* — JT IP Law, PC (57) ABSTRACT

A fishing reel includes a spool having a spool shaft and designed to receive fishing line. The fishing reel further includes a spool gear coupled to the spool shaft to rotate with the spool shaft. The fishing reel further includes a drag gear to interface with the spool gear, a main shaft that rotates about a different axis than the spool shaft, and a main shaft bearing positioned about the main shaft. The fishing reel further includes a plurality of friction washers including at least one drag washer to interface with and rotate with the drag gear, and at least one shaft washer to interface with and rotate with the main shaft. At least one of the friction washers is positioned radially outward from the main shaft bearing and is free to rotate relative to the main shaft via the main shaft bearing.

20 Claims, 6 Drawing Sheets

(56) References Cited

U.S. PATENT DOCUMENTS

| | | | | |
|---|---|---|---|---|
| 7,086,621 B1* | 8/2006 | Matsuzawa | ........ | A01K 89/0155 |
| | | | | 188/181 A |
| 8,490,909 B2* | 7/2013 | Takamatsu | ........... | A01K 89/015 |
| | | | | 242/306 |
| 8,985,492 B2* | 3/2015 | Niitsuma | ........... | A01K 89/0155 |
| | | | | 188/181 A |
| 9,781,911 B2* | 10/2017 | Ikuta | .................... | A01K 89/015 |
| 9,832,984 B2* | 12/2017 | Iwai | ..................... | A01K 89/027 |
| 10,470,448 B2* | 11/2019 | Takechi | ............. | A01K 89/0192 |

* cited by examiner

STAR DRAG FISHING REEL

CROSS-REFERENCE TO RELATED APPLICATIONS

This application claims the benefit and priority of U.S. Provisional Application No. 63/292,401, titled IMPROVED STAR DRAG FISHING REEL and filed Dec. 21, 2021, the entire disclosure of which being expressly incorporated by reference herein in its entirety.

BACKGROUND

1. Field

The present disclosure relates to fishing reels and, in particular, to a star drag fishing reel with features for added performance.

2. Description of the Related Art

Fishermen prefer different types of fishing reels for various situations. Star drag reels provide reduced friction while in free spool relative to lever drag reels. This reduced friction allows for greater casting distance and better swimming baits while the reel is in free spool. However, star drag reels present certain shortcomings that have yet to be overcome.

For example, star drag reels may include friction washers that alternately engage with a drag gear (gear washers) and with a main shaft coupled to a handle or crank (shaft washers). The gear washers may surround and contact the main shaft or a bushing coupled to the main shaft. In certain situations (e.g., torque applied to the drag gear that is greater than torque provided by friction between the friction washers as a result of a load, such as a large fish, coupled to line that is wound around a spool shaft), the gear washers may rotate relative to the main shaft. Such relative rotation may result in metal-on-metal friction (i.e., the inner diameter of the gear washers interfacing with the main shaft or bushing), thus undesirably causing wear to at least one of the inner diameter of the gear washers or the outer diameter of the main shaft or bushing. In some fishing reels, the shaft may be formed using a harder metal than the gear washers such that this friction increases a diameter of the opening of the washers. This metal-on-metal friction may also generate an undesirable noise as well as a non-constant amount drag applied to the drag gear.

A spool shaft may be coupled to a spool gear for engagement with the drag gear. The spool gear may be received by one or more static structure (e.g., a housing, an inner plate, or the like) which may or may not include a bushing, likewise resulting on metal-on-metal contact (i.e., between the spool shaft and the static structure or bushing). This metal-on-metal contact results in unwanted friction, which may undesirably cause wear to the spool gear and reduce performance of the fishing reel.

Furthermore, the reduced relative friction while in free spool may result in the spool shaft continuing to rotate after a reduction in speed of the line unwinding from the spool shaft. Such mismatch in spool shaft rotation and line unwinding may cause extra line that unwinds from the spool shaft to continue rotating around the spool shaft and becoming tangled with additional loose line around the spool shaft (which may be referred to as "backlash"). Such tangles are undesirable as they may cost a significant amount of time to untangle (which takes time away from fishing) and may result in the line becoming so tangled that the line must be cut off and, thus, replaced.

Thus, there is a need in the art for improved star drag fishing reels that overcome these shortcomings of conventional star drag reels.

SUMMARY

Described herein is a fishing reel that includes a spool having a spool shaft and configured to receive fishing line and to rotate about a first axis. The fishing reel further includes a spool gear configured to be coupled to the spool shaft and to rotate with the spool shaft. The fishing reel further includes a drag gear configured to interface with the spool gear. The fishing reel further includes a main shaft configured to rotate about a second axis. The fishing reel further includes a main shaft bearing configured to be positioned about the main shaft. The fishing reel further includes a plurality of friction washers including at least one drag washer configured to interface with and rotate with the drag gear, and at least one shaft washer configured to interface with and rotate with the main shaft, at least one of the plurality of friction washers being positioned radially outward from the main shaft bearing such that the at least one of the plurality of friction washers is free to rotate relative to the main shaft via the main shaft bearing.

Also described is a fishing reel that includes a casing. The fishing reel further includes a spool having a spool shaft and configured to receive fishing line and to rotate about a first axis. The fishing reel further includes a spool gear configured to be coupled to the spool shaft and to rotate with the spool shaft. The fishing reel further includes a spool bearing configured to be located radially outward from and contact the spool gear and to facilitate rotation of the spool gear relative to the casing. The fishing reel further includes a drag gear configured to interface with the spool gear. The fishing reel further includes a main shaft configured to rotate about a second axis. The fishing reel further includes a plurality of friction washers including at least one drag washer configured to interface with and rotate with the drag gear, and at least one shaft washer configured to interface with and rotate with the main shaft, the plurality of friction washers providing drag for the fishing reel.

Also described is a fishing reel that includes a casing. The fishing reel further includes a spool having a spool shaft and configured to receive fishing line and to rotate about a first axis, the spool further including a first end and a second end. The fishing reel further includes a spool gear configured to be coupled to the spool shaft and to rotate with the spool shaft. The fishing reel further includes a drag gear configured to interface with the spool gear. The fishing reel further includes a main shaft configured to rotate about a second axis. The fishing reel further includes a plurality of friction washers located closer to the second end of the spool than the first end of the spool, the plurality of friction washers including at least one drag washer configured to interface with and rotate with the drag gear, and at least one shaft washer configured to interface with and rotate with the main shaft, the plurality of friction washers providing drag for the fishing reel. The fishing reel further includes a cast control mechanism located closer to the second end of the spool than the first end of the spool.

BRIEF DESCRIPTION OF THE DRAWINGS

Other systems, methods, features, and advantages of the present disclosure will be or will become apparent to one of ordinary skill in the art upon examination of the following figures and detailed description. It is intended that all such additional systems, methods, features, and advantages be included within this description, be within the scope of the present disclosure, and be protected by the accompanying claims. Component parts shown in the drawings are not necessarily to scale, and may be exaggerated to better illustrate the important features of the present disclosure. In the drawings, like reference numerals designate like parts throughout the different views, wherein:

DETAILED DESCRIPTION

The present disclosure describes star drag fishing reels with various improvements over conventional star drag reels. The reels described herein include a main shaft bearing located radially between a main shaft and at least one friction washer that is used to provide drag, or resistance to torque of a line wound around a main spool. The main shaft bearing advantageously reduces metal-on-metal contact between the friction washer(s) and the main shaft, or between the friction washer(s) and a bushing positioned on the main shaft. This reduction in metal-on-metal contact provides the benefit of reducing wear experienced by the friction washer(s), the main shaft, and the bushing. The reels of the present disclosure further include one or more bearing (a spool bearing) positioned between a spool gear (which is coupled to a spool shaft) and a static structure of the reel. The spool bearing(s) further reduce friction within the fishing reel and improves the feel of the drag (i.e., provides a "smooth" drag) while pressure is applied to the line. The present disclosure further describes a cast control mechanism to improve casting ability and to reduce backlash while casting the fishing reel. The cast control mechanism is advantageously located on a side of the spool which is closer to the drag mechanism (such as the friction washers and a drag gear). This location of the cast control mechanism is located closer to a center of the spool shaft, and improves operation of the cast control feature (i.e., reduces the likelihood of backlash occurring as a result of a cast).

Referring generally to FIGS. 1, 2, 3A, and 3B, a fishing reel 100 is shown. The fishing reel 100 may be referred to as a dual star drag fishing reel (e.g., a fishing reel associated with the trade name TwinStarDrag® and available from Accurate Fishing Products of Corona, California), as it has a star drag control mechanism and matching drag washers on both sides of a drag gear to provide even drag pressure to both sides of the drag gear.

In particular, the fishing reel 100 includes a spool 102 having a spool shaft 122. The spool 102 (and spool shaft 122) are designed to rotate about a first axis A-A'. Fishing line (not shown) may be wound around the spool 102, as is known in the art. The fishing line may have a terminal end distal from the fishing reel 100 that may be tied to a hook or terminal tackle with the aim of hooking a fish by the hook or terminal tackle. The fishing reel 100 is designed to apply pressure to a fish (i.e., to resist the fish pulling line off of the spool 102) while simultaneously allowing line to come off the spool 102 when the force applied by the fish is greater than a maximum force threshold (the force threshold being adjustable by adjusting a star drag engagement lever 124, as described below). The maximum force threshold may be referred to as a maximum amount of "drag." It may be desirable for fishing line to come off of the spool 102 in this situation to prevent damage to, or breaking of, the fishing line. The fish will eventually tire itself out from forcing line off of the spool 102 and will be unable to continue removing the line. At this point, a handle 104 may be cranked in order to wind line back onto the spool 102 to retrieve the fish.

Figure 1:
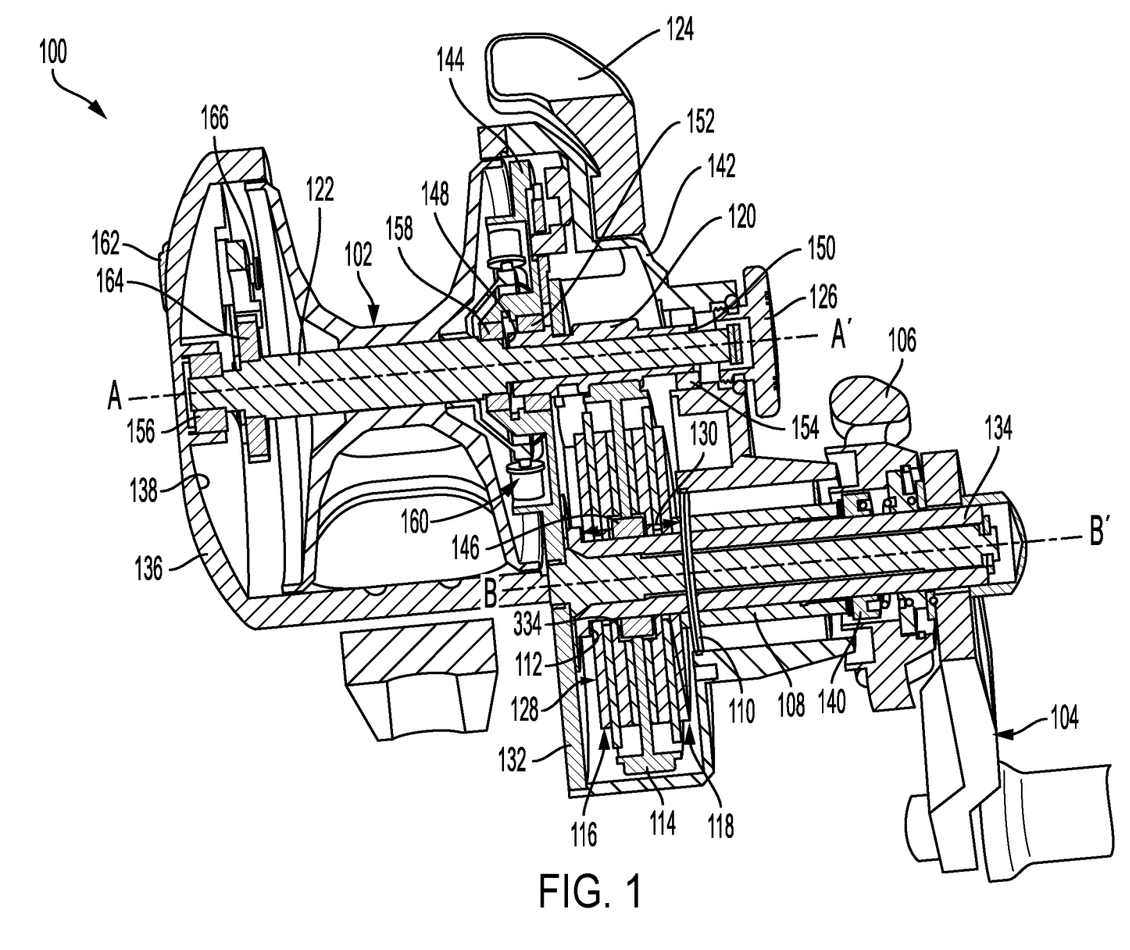
FIG. 1 is a cross-sectional view of a star drag fishing reel having various improvements according to some embodiments of the present disclosure.

The fishing reel 100 may further include a main housing 136, a side plate 142, and an inner plate 144. The main housing 136 may house a portion of the spool 102 as well as other elements of the fishing reel 100, as shown in FIG. 1. In some embodiments, at least one of the side plate 142 or the inner plate 144 may also house a portion of the spool 102, or define a portion of the spool 102. The main housing 136 and the side plate 142 may define a housing of the fishing reel 100, and the inner plate 144 may separate at least a portion of the spool 102 from at least a portion of the drag mechanism 128. The main housing 136 and the side plate 142 may be at least partially exposed to an environment of the fishing reel 100, and the inner plate 144 may be partially or wholly located within the fishing reel 100 (i.e., may or may not be exposed to the environment). At least one of the main housing 136, the side plate 142, or the inner plate 144 may include a relatively high tensile strength material such as aerospace-grade aluminum, stainless steel, a carbon-fiber material, or the like. These components (at least one of the main housing 136, the side plate 142, or the inner plate 144) may be formed from any material such as a metal, a plastic, or the like. In various embodiments, the main housing 136 may have a convex shape (represented by a curvature 138) at its outer edges that is designed to reduce an amount of material used in the fishing reel 100 while retaining structural integrity in potentially compromising situations. This reduction in weight is desirable as the trend in sportfishing has been towards lighter tackle.

The fishing reel 100 further includes a handle 104. The handle 104 may be coupled to the spool shaft 122 (via a main shaft 134 and gearing, as described more fully below) and may be used to rotate the spool shaft 122 about the first axis A-A' in order to wind line onto the spool 102. The handle 104 (and the main shaft 134) may rotate about a second axis B-B' which may be the same as, or different than, the first axis A-A'.

The fishing reel 100 may further include a star gear lever 106. The star gear lever 106 may include one or more finger (for example, 1 finger, between 2 and 12 fingers, or the like) and may resemble a star or asterisk. The star gear lever 106 may be rotated about an axis, such as the second axis B-B' or another axis. The star gear lever 106 may be used to adjust an amount of drag applied to the spool shaft 122 by the drag mechanism 128 when the drag is engaged, as will be discussed further below.

The fishing reel 100 may further include a nut 140 in contact with, or otherwise coupled to, the star gear lever 106. Rotation of the star gear lever 106 actuates the nut 140 along the axis B-B'. For example, the nut 140 may be threaded onto a threaded shaft, and rotation of the star gear lever 106 (and thus the nut 140) may actuate the nut 140, which pushes a drag sleeve 108 along the axis B-B'. The direction of actuation along the axis B-B' may be based on the direction of rotation of the star gear lever 106 (for example, clockwise rotation of the star gear lever 106 may actuate the nut 140 and drag sleeve 108 away from the handle 104 and counterclockwise rotation of the star gear lever 106 may actuate the nut 140 and drag sleeve 108 towards the handle 104).

The fishing reel 100 may further include a drag mechanism 128 which includes a drag housing 132, a first pressure pad 110, a second pressure pad 112, a drag gear 114, a first plurality of friction washers 116, and a second plurality of friction washers 118. The first pressure pad 110, the second pressure pad 112, the drag gear 114, the first plurality of friction washers 116, and the second plurality of friction washers 118 may be housed within the drag housing 132. The drag housing 132 may be formed integral (e.g., monolithic) with or separately from at least one of the main housing 136, the side plate 142, or the inner plate 144. Furthermore, the drag housing 132 may include one, two, or more pieces that are coupled together to define the drag housing 132. For example, the drag housing 132 may be defined by the main housing 136, the side plate 142, the inner plate 144, and one or more additional plate. In embodiments in which the drag housing 132 is separate from the main housing 136, the drag housing 132 may be coupled to at least one of the main housing 136, the side plate 142, or the inner plate 144 via fasteners, adhesive, welding, or any other coupling means.

The first plurality of friction washers 116 is located on a first end of the drag gear 114 along the axis B-B' (e.g., closer to the spool 102 than the second plurality of friction washers 118), and the second plurality of friction washers 118 is located on a second end of the drag gear 114 along the axis B-B' (e.g., closer to the handle 104 than the first plurality of friction washers 116). The friction washers 116, 118 and the drag gear 114 may be stacked along the axis B-B' and may be sandwiched between the first pressure pad 110 and the second pressure pad 112. The pressure pads 110, 112 may include any component such as a disk or washer, a lip, a surface defined by a housing or sleeve (e.g., the second pressure pad 112 may include a surface of the drag housing 132), or the like. In some embodiments, the first pressure pad 110 may be actuated along the axis B-B' via interference between the first pressure pad 110 and the drag sleeve 108, and the second pressure pad 112 may be retained in place by the drag housing 132. The pressure pads 110, 112 may be capable of frictionally engaging with the friction washers 116, 118 or may provide compression without frictional engagement. The pressure pads 110, 112 may be separate components or may be integral (i.e., formed monolithic) with the drag housing 132.

Although the drawings illustrate two pluralities of friction washers 116, 118, a fishing reel according to the present disclosure may only include one plurality of friction washers. In that regard, a drag gear may have a first side that is located adjacent to a first pressure pad, and a plurality of friction washers may be stacked adjacent to a second side of the drag gear such that the drag gear and plurality of friction washers are stacked between a first pressure pad and a second pressure pad.

The fishing reel 100 may further include a spool gear 120 coupled to the spool shaft 122 and configured to rotate along with the spool shaft 122. The spool gear 120 may be coupled to the spool shaft 122 via any known means such as via fastener(s), via adhesive, via tongue and groove features on the spool gear 120 and spool shaft 122, or the like. The fishing reel 100 may further include a drag engagement lever 124. The drag engagement lever 124 may be actuated between a first position which causes the spool gear 120 engage with the drag gear 114, and a second position which causes the spool gear 120 to disengage from the drag gear 114. For example, the spool gear 120 and the drag gear 114 may each include teeth, or cogs, designed to interface with each other. When the drag engagement lever 124 is actuated to the first position, it may cause the teeth of the spool gear 120 to engage with the teeth of the drag gear 114, thus rotatably coupling the spool gear 120 to the drag gear 114. As another example, the spool gear 120 may have two portions that may clamp around the spool shaft 122 such that actuation of the drag engagement lever 124 to the first position causes the two portions to clamp together around the spool shaft 122 (coupling the spool gear 120, and thus the drag gear 114, to the spool shaft 122) and actuation of the drag engagement lever 124 to the second position loosens the spool gear 120 from the spool shaft 122 to allow the spool shaft 122 to rotate relative to the spool gear 120 (and thus the drag gear 114). The drag engagement lever 124 may engage and disengage the drag gear 114 and the spool shaft 122 using any known means.

When the spool gear 120 is engaged with the drag gear 114, the drag gear 114 is rotatably coupled to the spool gear such that the two rotate together, for example, at the same radial velocity. In some embodiments, the gear ratio between the drag gear 114 and the spool gear 120 may be other than 1 to 1 such that the radial velocity and/or torque differs from the drag gear 114 to the spool gear 120. Engagement between the drag gear 114 and spool gear 120 may result in drag (i.e., resistance or pressure) being applied to the spool 102 via the drag gear 114 (i.e., pressure or resistance is applied to the drag gear 114 by the friction washers 116, 118 and pressure pads 110, 112, which is then transferred to the spool shaft 122 and the spool 102 via the spool gear 120). Pressure is applied to the drag gear 114 by compression of the friction washers 116, 118 (and the drag gear 114) between the pressure pads 110, 112.

The amount of pressure applied to the drag gear 114 (i.e., the amount of drag) can be adjusted by rotating the star gear lever 106. As the star gear lever 106 is rotated in a first direction, the nut 140 is actuated towards the first pressure pad 110 (the second pressure pad 112 may remain in place relative to the drag housing 132 such that the nut 140 forces the first pressure pad 110 towards the second pressure pad 112). For example, the nut 140 may be threaded about a threaded shaft and may rotate with the star gear lever 106, such rotation causing the threading of the nut 140 to engage with the threading of the threaded shaft and to actuate towards the second pressure pad 112 (or the threaded shaft may be caused to rotate, thus causing the nut to actuate towards the second pressure pad 112). The compression of the friction washers 116, 118 causes increased friction between the friction washers 116, 118, thus increasing resistance to rotation of the spool shaft 122.

This actuation increases pressure applied to the drag gear 114 by the friction washers 116, 118 by forcing the friction washers 116, 118 towards the drag gear 114 (i.e., by decreasing a distance 130 between the first pressure pad 110 and the second pressure pad 112). Stated differently, the friction washers 116, 118 and the drag gear 114 are further compressed between the pressure pads 110, 112, thus increasing friction between the friction washers 116, 118 and the drag gear 114. This increased friction increases the drag applied to the line by the fishing reel 100.

As the star gear lever 106 is rotated in a second direction (opposite from the first direction), the nut 140 is actuated away from the first pressure pad 110. This actuation reduces pressure applied to the drag gear 114 by the friction washers 116, 118 (i.e., decompresses the plurality of friction washers 116, 118) by allowing the friction washers 116, 118 to at least partially separate from the drag gear 114 (i.e., by increasing the distance 130 between the first pressure pad 110 and the second pressure pad 112, or by reducing the compression of the friction washers 116, 118 and drag gear 114 between the pressure pads 110, 112).

The handle 104 may be coupled or fixed to the main shaft 134, and the drag gear 114 may likewise be coupled or fixed to the main shaft 134. For example, certain friction washers may be keyed to interface with and rotate with the main shaft 134, and the friction between the friction washers 116, 118 and the drag gear 114 may transfer the torque applied to the friction washers that interface with the main shaft to the drag gear 114. In that regard, the handle 104 may rotate with the main shaft 134, and the drag gear 114 may rotate with the main shaft 134 due to the interface between certain friction washers and the main shaft 134 and due to the friction between the friction washers 116, 118 and the drag gear 114. In some embodiments, the fishing reel 100 may be designed such that the handle 104 may rotate (and rotate with) the main shaft 134 when rotated in a first direction but fails to rotate (and fails to rotate with) the main shaft 134 when rotated in a second direction.

When the spool gear 120 is engaged with the drag gear 114, rotation of the handle 104 in turn rotates the main shaft 134. This rotation (i.e., torque) transfers through the friction washers that are engaged with the main shaft 134 to the drag gear 114, and transfers from the drag gear to the spool gear 120 and spool shaft 122, thus rotating (i.e., applying torque to) the spool shaft 122 and winding line onto the spool 102. In response to the pressure applied to the line being greater than allowed by the drag mechanism 128 (i.e., the torque applied to the drag gear 114 being greater than the friction between the friction washers 116, 118 and the drag gear 114 such that the drag gear 114 "slips" between the friction washers 116, 118), the torque applied to the handle 104 likewise slips and line fails to be wound onto the spool 102 until the pressure applied to the line is less than or equal to that allowed by the drag mechanism 128. This is a result of the torque applied to the drag gear 114 via the spool shaft 122 and the spool gear 120 being greater than the torque applied by friction between the friction washers 116, 118, such that the drag gear 114 rotates relative to the adjacent friction washers 116, 118. As discussed above, the friction between friction washers 116, 118 may be increased and decreased by rotating the star gear lever 106 in either direction to increase or decrease axial pressure applied to the friction washers 116, 118 via the nut 140 and the drag sleeve 108. When the spool gear 120 is disengaged from the drag gear 114, rotation (i.e., applied torque) of the handle 104 may rotate the main shaft 134 and drag gear 114, but such rotation (i.e., torque) fails to transfer from the main shaft 134 to the spool shaft 122, and thus rotation of the handle 104 fails to transfer to the spool shaft 122.

The fishing reel 100 may further include a tension adjustment mechanism 126. The tension adjustment mechanism 126 may include a knob, dial, lever, or the like. The tension adjustment mechanism 126 may be rotated (in such embodiments as when it includes a knob or dial) to adjust an amount of tension applied to the spool shaft 122 when the spool gear 120 is disengaged from the drag gear 114. Stated differently, rotation of the tension adjustment mechanism 126 may adjust an amount of tension applied to the spool 102 when the fishing reel 100 is in free spool. This adjustment may be desirable as some anglers are more skilled at preventing a line tangle during casting of a reel and may wish to reduce the tension applied to the spool shaft 122, while other anglers of less skill would desire increased tension applied to the spool shaft 122.

Figure 3A:
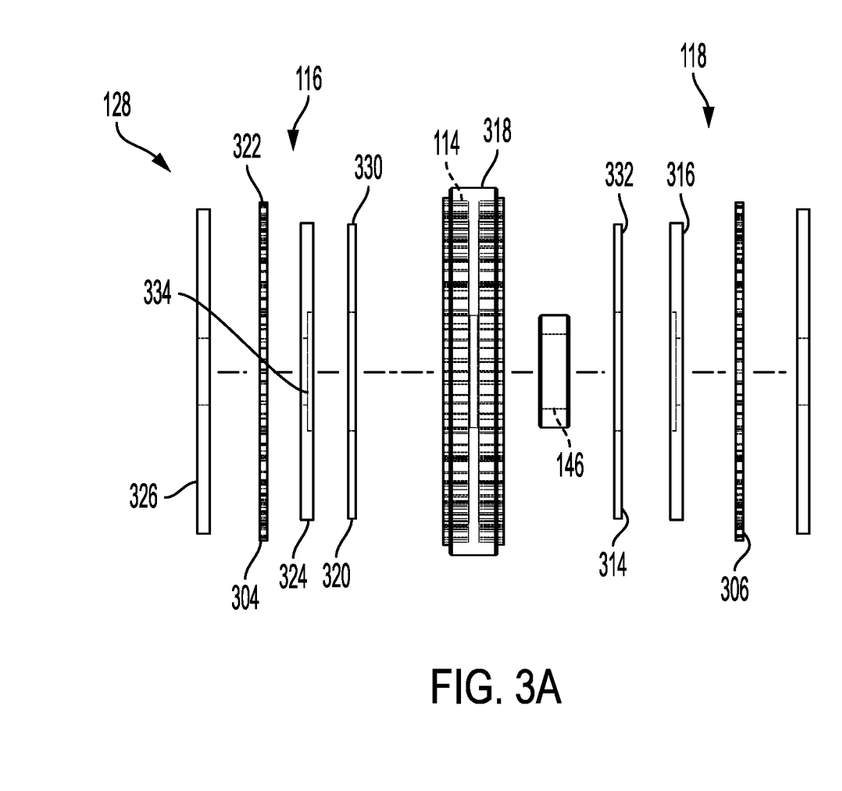
FIG. 3A is an exploded side view of the portion of the drag mechanism of FIG. 2 according to some embodiments of the present disclosure.
Figure 3B:
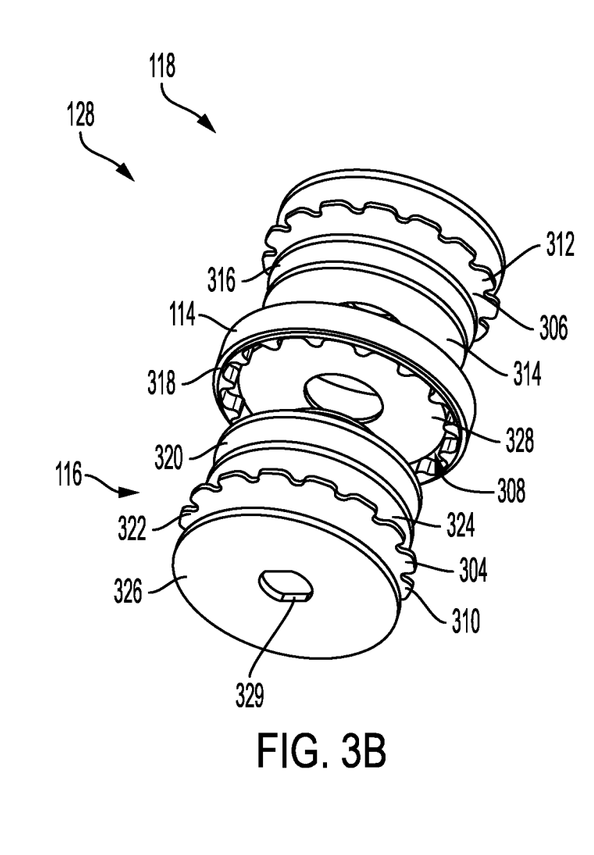
FIG. 3B is an exploded isometric view of the portion of the drag mechanism of FIG. 2 according to some embodiments of the present disclosure.

Additional information regarding the drag mechanism 128 will now be discussed. FIGS. 3A and 3B illustrate the drag mechanism 128 in an exploded view. As shown and in some embodiments, a quantity of the first plurality of friction washers 116 may be equal to a quantity of the second plurality of friction washers 118. For example, the quantity of the first plurality of friction washers 116 and the quantity of the second plurality of friction washers 118 may both be 2, 3, 4, 5, 6, or the like. Likewise, a dimension or dimensions (such as a diameter and/or a thickness) of the first plurality of friction washers 116 may be equal to a dimension or dimensions (such as a diameter and/or a thickness) of the second plurality of friction washers 118. In that regard, the first plurality of friction washers 116 may be a mirror image of the second plurality of friction washers 118.

Such matching of the friction washers 116, 118 advantageously allows for, or provides, substantially equal pressure (or friction) to be applied to the drag gear 114 by the first plurality of friction washers 116 and by the second plurality of friction washers 118. Where used in this context, "substantially" refers to the referenced value plus or minus 20 percent (20%) of the referenced value. In that regard, the amount of pressure applied to the drag gear 114 by the first plurality of friction washers 116 may be within 20% of the amount of pressure applied to the drag gear 114 by the second plurality of friction washers 118. This matching of the friction washers 116, 118 results in a smooth feel when the drag is engaged (i.e., such as when a fish is hooked on a terminal end of the fishing line) and reduced wear on the friction washers 116, 118 (i.e., wear will be evenly distributed to friction washers 116, 118 on both sides of the drag gear 114 rather than concentrated on a single side). This matching of the friction washers 116, 118 also increases a total amount of drag achievable by the fishing reel 100 because friction may be applied to both sides of the drag gear 114. However, as discussed above, the features of the present disclosure may also apply to a star drag fishing reel having only a plurality of friction washers on a first side of a drag gear and not on a second side.

The drag gear 114 may include a drag gear housing 318 coupled to the drag gear 114. The drag gear housing 318 may define at least one notch 308 on either side of the drag gear 114. In some embodiments, as shown in FIG. 3B, the drag gear housing 318 defines a plurality of evenly circumferentially distributed notches 308 on either side of the drag gear 114. The first plurality of friction washers 116 may include a first protrusion washer (or "first stabilizing washer") 304, and the second plurality of friction washers 118 may include a second protrusion washer (or "second stabilizing washer") 306. Each of the protrusion washers 304, 306 may include at least one protrusion 310, 312 jutting outward therefrom. The protrusions 310, 312 may be received by the drag gear housing 318 to reduce the likelihood of rotation of the protrusion washers 304, 306 relative to the drag gear 114. That is, the protrusion washers 304, 306 may be rotatably coupled to the drag gear 114 via engagement between the protrusions 310, 312 and the notches 308.

In some embodiments, the friction washers 116, 118 may include alternating smooth washers 314 and friction washers 316. For example, the friction washers 116 may include one or more shaft washers 324, 326 interspersed with one or more drag washers 320, 322. At least one of the drag washers 320, 322 may be rotatably engaged with, or coupled to, the drag gear 114. Similarly, at least one of the shaft washers 324, 326 may be rotatably engaged with, or coupled to, the main shaft 134. For example, the shaft washers 324, 326 may have an engagement feature 329 having at least one edge designed to interface with an edge of the main shaft 134 such that rotation of the main shaft 134 rotates the shaft washers 324, 326 via engagement between the edges. The drag washers 320, 322 may include a carbon fiber or other material designed to provide a friction surface on either side, and the shaft washers 324, 326 may include a metal, such as stainless steel or aluminum, which may have smooth surfaces, friction-inducing surfaces, or both. In some embodiments, the smooth washers 314 and the friction washers 316 may include the same material, the same features, or the like. The drag gear 114 may have a friction surface 328 on both sides (i.e., the side that faces the friction washers 116 and the side that faces the friction washers 118), and the friction surfaces 328 may interface with the friction washers 116, 118 to generate friction therebetween. In that regard, the drag washer 320 may contact the friction surface 328 of the drag gear 114.

In operation, at least one of the drag washers 320, 322 may be rotatably coupled to the drag gear 114, and at least one of the shaft washers 324, 326 may be rotatably coupled to the main shaft 134. As force is applied to the main shaft 134 via the handle 104, the main shaft 134 (and thus the shaft washers 324, 326) may rotate. Friction between the shaft washers 324, 326 may result in rotation of the drag washers 320, 322, which in turn rotates the drag gear 114. This rotation of the drag gear 114 results in rotation of the spool gear 120 and, thus, the spool shaft 122, winding line onto the spool 102. However, if the force applied to the line on the spool 102 is greater than the set amount of drag (which is set by the compression of the friction washers 116, 118) then friction between the drag washers 320, 322 and the shaft washers 324, 326 will be insufficient to transfer all rotation therebetween, thus allowing slipping between the drag washers 320, 322 and the shaft washers 324, 326. This slipping allows the drag gear 114 to rotate relative to the main shaft 134, thus allowing line to come off of the spool 102.

Figure 2:
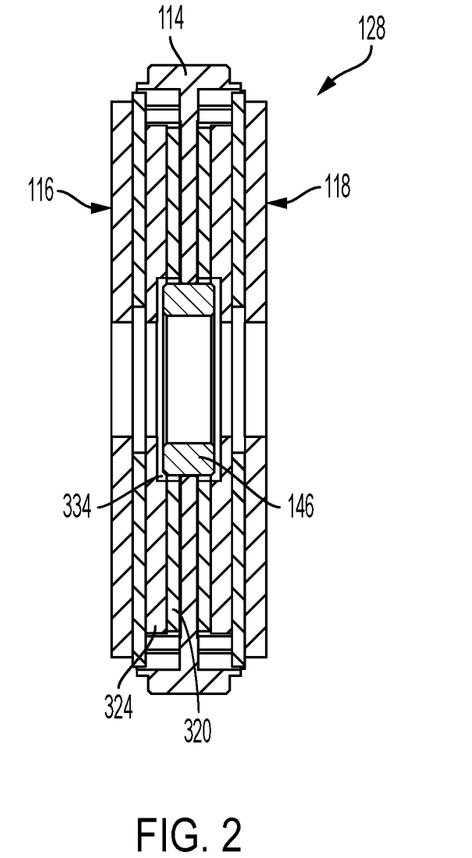
FIG. 2 is a cross-sectional view of a portion of a drag mechanism of the fishing reel of FIG. 1 according to some embodiments of the present disclosure.

As shown, the drag mechanism 128 may further include a main shaft bearing 146 positioned circumferentially around the main shaft 134. In some embodiments, the main shaft bearing 146 may be positioned radially between the drag gear 114 and the main shaft 134. The main shaft bearing 146 may include any type of bearing such as a ball bearing, a roller bearing, a needle bearing, or the like. In that regard, the main shaft bearing 146 may allow the drag gear 114 to rotate freely relative to the main shaft 134. The main shaft bearing 146 may or may not contact the drag gear 114.

In some embodiments, the drag washers 320 adjacent to the drag gear 114 may be positioned radially outward from the main shaft bearing 146. In that regard, the drag washers 320 adjacent to the drag gear 114 may be referred to as floating friction washers 330, 332 as they may float relative to the main shaft 134. The floating friction washers 330, 332 may be located radially outward from the main shaft bearing 146 such that the main shaft bearing 146 is located radially between the floating friction washers 330, 332 and the main shaft 134.

In some embodiments, one or more shaft washer 324, 326, such as the shaft washers 324 that are adjacent to the floating friction washers 330, 332, may be at least partially positioned radially outward from the main shaft bearing 146. For example, the shaft washers 324 may be formed to have a counterbore 334 having a larger diameter portion that is designed to at least partially receive the main shaft bearing 146 and a smaller diameter portion that is designed to rotationally engage the main shaft 134. In that regard, the larger diameter portion may be located adjacent to the drag washers 320 and the smaller diameter portion may be located adjacent to the drag washers 322.

The main shaft bearing 146 may reduce metal-on-metal contact between moving parts within the drag mechanism 128. For example, the main shaft bearing 146 may reduce contact between the drag gear 114 and the main shaft 134 and between the drag washers 320 and the main shaft 134. This reduction in contact reduces the likelihood of wear to components of the drag mechanism 128, reduces heat generation by the drag mechanism 128, and improves the feel of the fishing reel (e.g., makes the drag have a "smoother," or "non-jerky" feel).

Figure 4:
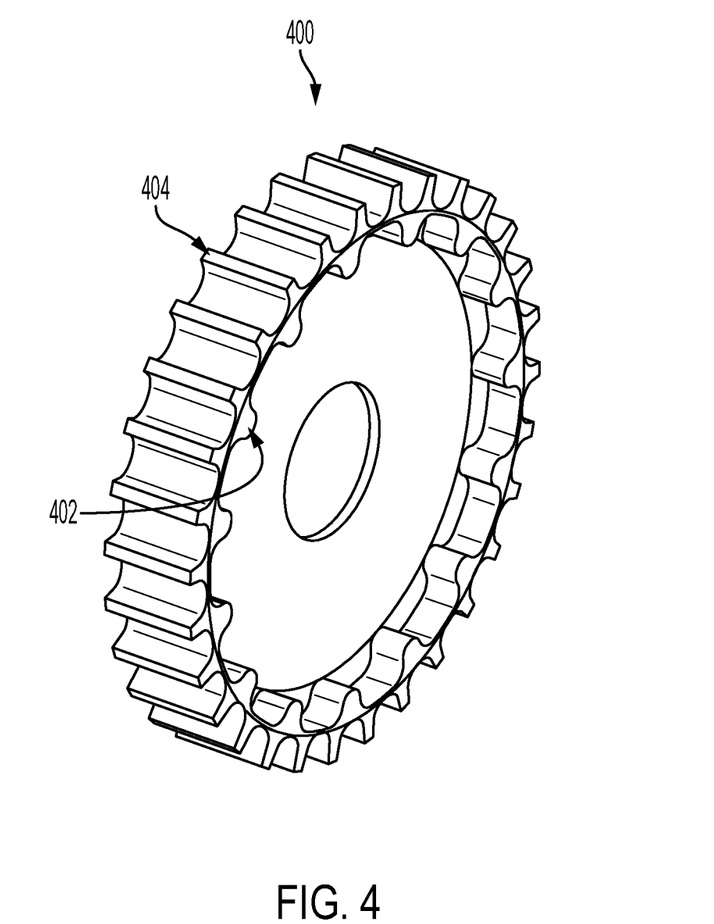
FIG. 4 is an isometric view of a drag gear usable in the fishing reel of FIG. 1 according to some embodiments of the present disclosure.

Referring briefly to FIG. 4, another drag gear 400, which may be used in place of the drag gear 114 of FIG. 1, is shown. The drag gear 400 may include internal notches 402 that engage with at least one protrusion of a drag washer, resulting in the drag washer being rotatably coupled to the drag gear 400. Similarly, the drag gear 400 may include external notches 404 that engage with protrusions (not shown) of the spool gear 120, resulting in the spool gear 120 being rotatably coupled to the drag gear 400.

Returning reference to FIGS. 1, 2, 3A, and 3B and as mentioned above, the present disclosure may apply to a fishing reel having only friction washers on one side of a drag gear. In that regard, such a fishing reel may still include a bearing with one or more floating friction washer, may include one or more friction washer with a counterbore to receive the bearing, or the like.

Figure 5:
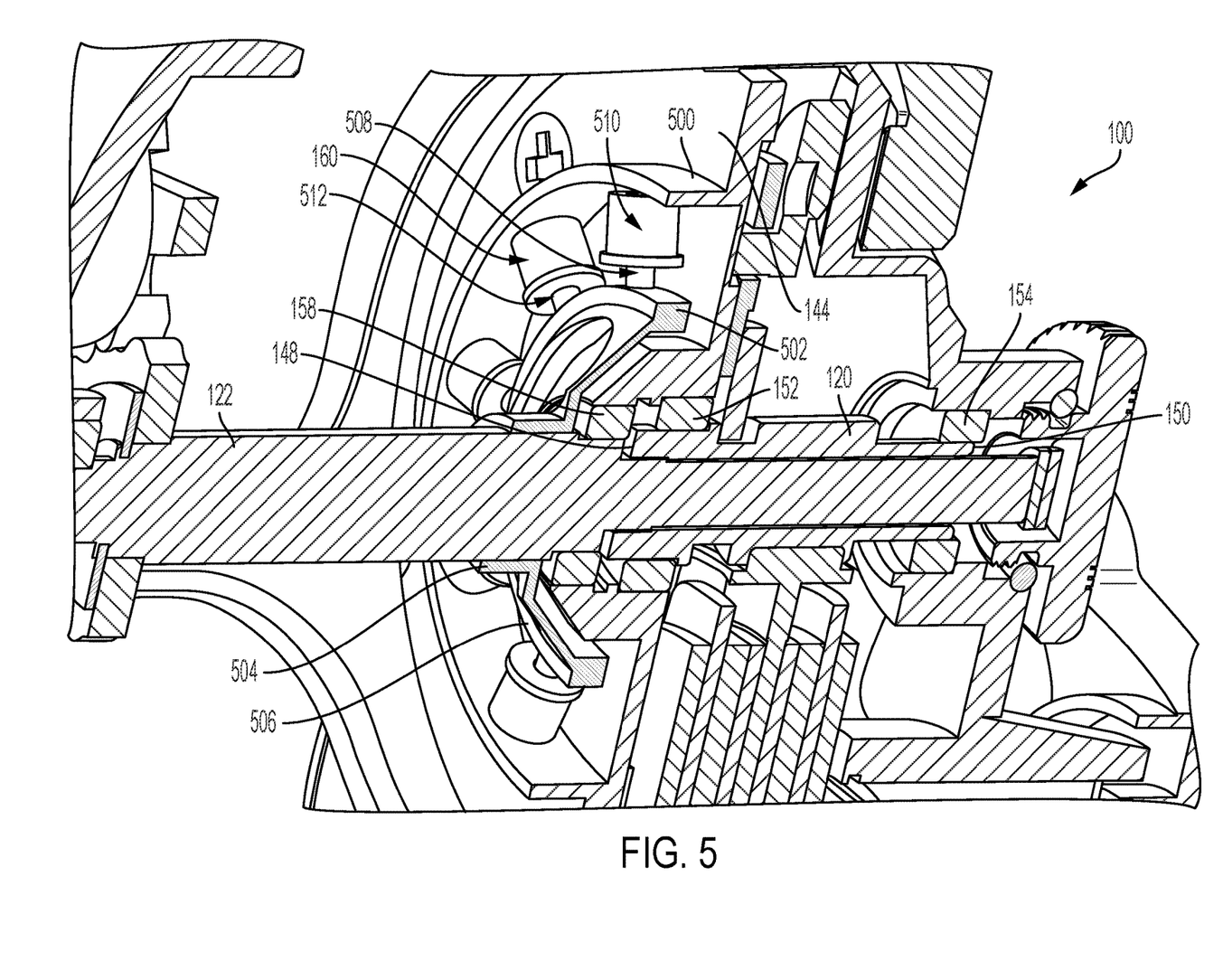
FIG. 5 is a cross-sectional isometric view of a portion of the fishing reel of FIG. 1 illustrating a cast control mechanism and spool bearings according to some embodiments of the present disclosure.

Turning to FIGS. 1 and 5, additional details of the fishing reel 100 are shown. In particular, the spool gear 120 (which is rotatably coupled to the spool shaft 122) may have a first end 148 (first axial end) and a second end 150 (second axial end). In some embodiments, the first end 148 may be located closer to the spool 102 than the second end 150. In some embodiments, the second end 150 may be located closer to the handle 104 than the first end 148.

Conventional star drag fishing reels place a spool gear directly in contact with a static structure of the fishing reel, or include a bushing between the spool gear and static structure. Such metal-on-metal contact undesirably results in wear of components of the fishing reel, results in a jerky feel when reeling, and shortens a life of the fishing reel. In order to overcome such detriments, the fishing reel 100 of the present disclosure includes at least one spool bearing positioned radially between the spool gear 120 and a static structure of the fishing reel 100. The spool gear 120 may be coupled to the spool shaft 122 or may be formed integral or monolithic with the spool shaft 122 and may rotate with the spool shaft 122.

The at least one spool bearing may include a first spool bearing 152 and a second spool bearing 154. The first spool bearing 152 may be located closer to the first axial end 148 of the spool gear 120 than the second axial end 150 of the spool gear 120. The second spool bearing 154 may be located closer to the second axial end 150 of the spool gear 120 than the first axial end 148. Likewise, the first spool bearing 152 may be located closer to the first axial end 148 than the second spool bearing 154. In that regard, the first spool bearing 152 may be located closer to the spool 102 than the second spool bearing 154, and the second spool bearing 154 may be located closer to the handle 104 than the first spool bearing 152.

The casing of the fishing reel 100 may include various components including a main housing 136, a side plate 142, an inner plate 144, and a drag housing 132. At least some of these components of the casing may be referred to as a static structure as these components fail to rotate with either the spool shaft 122 and the main shaft 134. In that regard, the first spool bearing 152 and the second spool bearing 154 may be coupled between a static structure and the spool gear 120 and may facilitate rotation of the spool gear 120 relative to the static structure. As an example and as shown in FIGS. 1, and 5, the first spool bearing 152 may be located radially between the spool gear 120 and the inner plate 144, and the second spool bearing 154 may be located radially between the side plate 142 and the spool gear 120. This positioning of the spool bearings is a specific embodiment, however, one skilled in the art will realize that a fishing reel according to the present disclosure may include one, two, or more spool bearings, and that a fishing reel according to the present disclosure may include one or more spool bearing coupled between a spool gear and any static structure of the fishing reel.

The spool bearings 152, 154 may facilitate rotation of the spool gear 120 (and potentially the spool shaft 122) relative to ay static structure of the fishing reel 100. In that regard, the spool bearings 152, 154 may provide benefits such as reducing metal-on-metal contact within the fishing reel 100, thus increasing a life span of the fishing reel 100, improving performance (e.g., by reducing friction which in turn reduces a jerky feel), reducing the likelihood of accumulation of heat in the fishing reel 100 (which may degrade performance), and the like.

In some embodiments, the spool bearings 152, 154 may be located elsewhere within the fishing reel 100. For example, the fishing reel 100 may have a spool shaft 122 that extends to either side of the spool gear 120, and may include spool bearings positioned radially between the spool shaft 122 and a static structure and on either axial side of the spool gear 120 (e.g., the spool bearings may surround both axial ends 148, 150 of the entire spool gear 120). Such positioning of spool bearings may provide some of the same advantages of the spool bearings 152, 154 described above.

In some embodiments, the fishing reel may also include one or more spool shaft bearing coupled radially between the spool shaft 122 and any static structure of the fishing reel 100 to facilitate rotation of the spool shaft 122 relative to the static structure. The fishing reel 100 may include any quantity of spool shaft bearings. For example and as shown in FIGS. 1 and 5, the fishing reel 100 may include a first spool shaft bearing 156 and a second spool shaft bearing 158. The first spool shaft bearing 156 may be located on a first side of the spool 102 (e.g., a side of the spool opposite the handle 104, the drag mechanism 128, and the spool gear 120), and the second spool shaft bearing 158 may be located on a second side of the spool 102 (e.g., on a same side of the spool 102 as the handle 104, the drag mechanism 128, and the spool gear 120).

As shown, the first spool bearing 156 may be located between the main housing 136 and the spool shaft 122, and the second spool bearing 158 may be located between the inner plate 144 (or a sleeve 502) and the spool shaft 122. In some embodiments, the fishing reel 100 may include any quantity of spool bearings such as one, two, or more. Similarly, the spool bearings may be located anywhere along the spool shaft 122 and radially positioned between the spool shaft 122 and any static structure of the fishing reel 100.

Inclusion of all bearings 146, 152, 154, 156, 158 facilitates rotation of the various rotating components (e.g., the main shaft 134, the spool shaft 122, the spool gear 120, the friction washers 116, 118, or the like) while reducing metal-on-metal contact within the fishing reel. This reduction in metal-on-metal contact provides advantages, as discussed elsewhere, such as extending a life of the various components of the fishing reel 100 (by reducing wear), providing a smooth-feeling drag, and the like.

The spool bearings 152, 154, the spool shaft bearings 156, 158, and the main shaft bearing 146 may include any types of bearings, and may each include the same or different types of bearings. For example, one or more of the bearings 146, 152, 154, 156, 158 may include a ball bearing, a cylindrical roller bearing, a tapered roller bearing, a needle bearing, or the like. For example, each of the bearings 146, 152, 154, 156, 158 may include a ball bearing. As another example, the main shaft bearing 146 may include a ball bearing and the remaining bearings 152, 154, 156, 158 may include cylindrical roller bearings. As yet another example, the main shaft bearing 146 may include a cylindrical roller bearing, the spool shaft bearings 156, 158 may include ball bearings, and the spool bearings 152, 154 may include tapered roller bearings. Any combination of bearing types may be used for the bearings 146, 152, 154, 156, 158.

Figure 6:
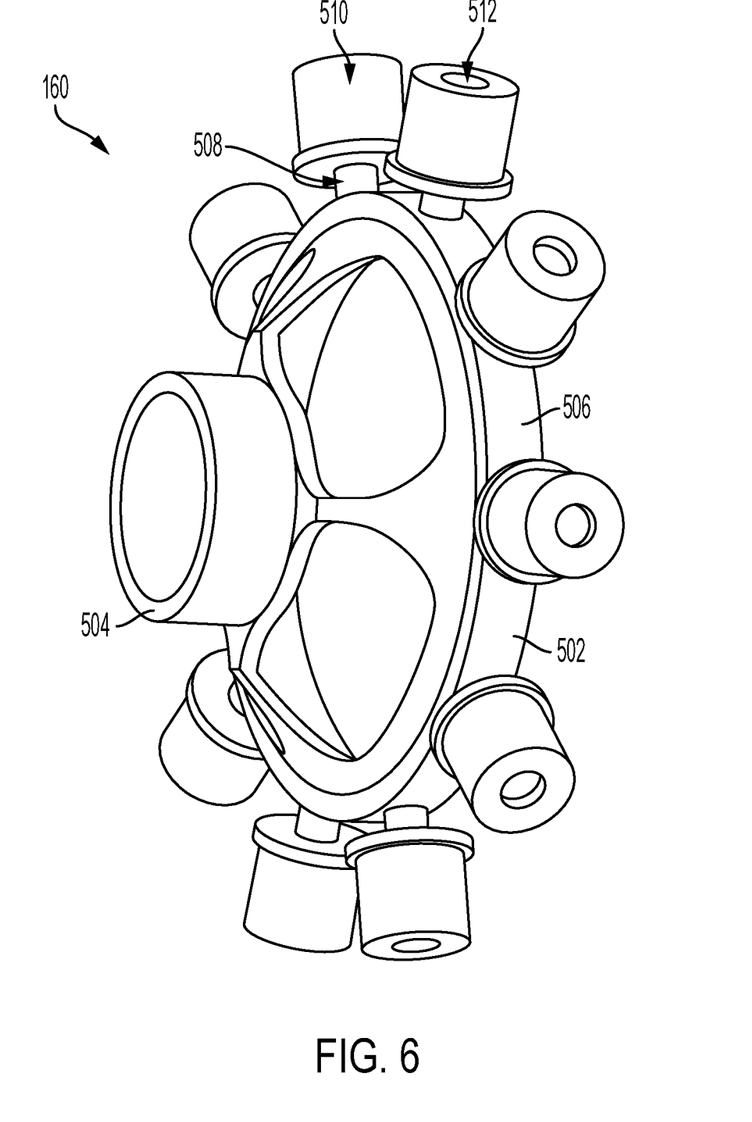
FIG. 6 is an isometric view of a portion of the cast control mechanism of the fishing reel of FIG. 1 according to some embodiments of the present disclosure.

Turning now to FIGS. 1, 5, and 6 and as referenced above, the fishing reel 100 may include a cast control mechanism 160 to improve casting ability of the fishing reel 100 and to reduce backlash while casting the fishing reel 100. The design of the cast control mechanism 160 provides advantages over conventional fishing reels both as a result of the design of the cast control features as well as the location of the cast control mechanism 160 on a side of the spool which is closer to the handle 104 and the drag mechanism 128 (such as the friction washers and a drag gear). This location of the cast control mechanism is located closer to a center of the spool shaft 122, which provides even application of the cast control mechanism 160 across the spool shaft 122 and provides improved operation of the cast control feature (i.e., reduces the likelihood of backlash occurring as a result of a cast and improves casting range). Conventional fishing reels (and especially star drag fishing reels) position a cast control mechanism on an opposite side of a spool from the handle and drag mechanism. This positioning of the cast control is far from centered on a spool shaft and fails to operate as well as the cast control mechanism 160 of the fishing reel 100 of the present disclosure.

The cast control mechanism 160 may include a sleeve 502 that is positioned around and coupled to the spool shaft 122, and positioned radially inward relative to the inner plate 144. In that regard, the sleeve 502 may rotate with the spool shaft 122. The sleeve 502 may be made from any material such as a plastic, a polymer, a metal (e.g., high grade aluminum), or the like, and may include a shaft portion 504 and a body portion 506. The shaft portion 504 may have a smaller radius than the body portion 506 and may be positioned about and coupled to the spool shaft 122. For example, the shaft portion 504 may be coupled to the spool shaft using any technique such as being formed monolithic with the spool shaft 122, via use of adhesive, via use of fasteners (e.g., screws, bolts, or the like), or any other coupling means. The body portion 506 may have a greater diameter than the shaft portion 504, and may be located radially outward and axially spaced from the shaft portion 504. In some embodiments, the body portion 506 may have the same or a similar diameter as the shaft portion 504, may be axially aligned with the shaft portion 504, or the like. The body portion 506 may be formed monolithic with the shaft portion 504 and may be spaced from the shaft portion 504 via spacing bars, as shown in FIG. 6. Use of the spacing bars may be advantageous by reducing weight of the fishing reel 100 relative to use of a solid spacing plate. In some embodiments, the body portion 506 may be formed separately from the shaft portion 504 and coupled to the shaft portion 504 using any other means.

The inner plate 144 may include or define a lip 500 extending outward therefrom and designed to be located radially outward from the sleeve 502. The lip 500 may be radially spaced apart from the body portion 506 of the sleeve 502, and may be evenly spaced from the body portion 506 at all circumferential locations. In that regard, an even distance may exist from the lip 500 to the body portion 506 at all locations along the lip 500 and body portion 506.

The cast control mechanism may further include at least one pin 508 extending outward from, and coupled to, the body portion 506 of the sleeve 502. In that regard, the at least one pin 508 may rotate with the sleeve 502 (and the spool shaft 122) about the axis A-A'. The at least one pin 508 may be formed integral with, or separately from, the body portion 506 of the sleeve 502. In some embodiments, the at least one pin 508 may include multiple pins extending away from the body portion 506 at multiple circumferential locations about the body portion 506. In some embodiments, the multiple pins 508 may be evenly spaced about the circumference of the body portion 506. For example, the cast control mechanism 160 may include 3 pins 508, 4 pins 508, 6 pins 508, 8 pins 508, 10 pins 508, 12 pins 508, or any other quantity of pins 508. In some embodiments, the pins may be spaced unevenly about the circumference of the body portion 506. Experiments have found that even spacing may not affect operation of the cast control mechanism 160.

The cast control mechanism 160 may further include at least one body 510 defining an opening 512 designed to receive a respective pin 508. In that regard, the cast control mechanism 160 may include a quantity of bodies 510 that is equal to a quantity of pins 508. Each body 510 may be received by a respective pin 508. In that regard, the openings 512 may be designed such that the body 510 may move radially along the pin 508 and be able to contact the lip 500 of the inner plate 144. In that regard, the opening 512 may or may not extend along an entire length of the body 510 but may be sufficiently long that the body 510 is capable of reaching and contacting the lip 500. In some embodiments, each body 510 may include a magnet or other attractive force that attracts the body 510 to the body portion 506 of the sleeve 502. In some embodiments, no such attractive force may be present such that the body 510 is free to move between the body portion 506 and the lip 500.

As the fishing reel 100 is used to cast a lure or bait, the spool shaft 122 rotates to allow fishing line to unwind from the spool 102. This rotation of the spool shaft 122 in turn rotates the sleeve 502. The centrifugal force of this rotation of the body portion 506 of the sleeve 502 urges the bodies 510 radially outward towards the lip 500. In embodiments in which the bodies 510 are attracted to the body portion 506 of the sleeve 502, the centrifugal force may overcome the attraction of the bodies 510 to the body portion 506 such that the bodies 510 may contact the lip 500. In that regard, the force of this urging of the bodies 510 towards the lip 500 is based on an angular velocity of the spool shaft 122 such that a greater angular velocity increases the force between the bodies 510 and the lip 500, and a reduced angular velocity decreases this force. Rotation of the sleeve 502 (and thus the bodies 510) relative to the lip 500 while the bodies 510 are in contact with the lip 500 generates friction between the bodies 510 and the lip 500 (and the friction may be increased or decreased based on the force, which is based on the angular velocity). This friction slows rotation of (i.e., brakes) the sleeve 502 and, thus, the spool 102. When the lure or bait hits the water, line stops being removed from the spool 102. This may occasionally result in rotation of the spool 102 while no line is being removed from the spool 102, which may cause the line to become loose and wrap around the spool 102, undesirably causing backlash which may tangle the fishing line. The braking force applied to the spool shaft 122 by the friction between the bodies 510 and the lip 500 reduces this unwanted continued rotation of the spool 102, reducing the likelihood of experiencing backlash in this situation.

The design of the cast control mechanism 160 of the fishing reel 100 shown herein provides additional advantages such as allowing access to the cast control mechanism 160 in order to replace the bodies 510 with bodies of a different mass (to increase or decrease braking of the fishing reel 100), to replace damaged bodies 510, to remove the bodies 510 to operate the reel 100 without the cast control mechanism 160, or the like. In that regard, a portion of the casing of the fishing reel may be removed (e.g., the side plate 142 may be removed from the remainder of the casing) and the inner plate 144 may also be removed. Removal of the inner plate 144 allows access to the bodies 510 such that they may be removed from the respective pins 508. New bodies may be placed about the pins 508 and the inner plate 144 and side plate 142 may be re-attached to the casing to cause the new bodies to be correctly positioned about the pins 508.

Use of magnetic forces (e.g., by adding magnets in at least one of the bodies 510 or the body portion 506 of the sleeve 502) may be desirable as it can cause the bodies 130 to remain on the respective pins 508 regardless of whether the side plate 142 and/or inner plate 144 are installed or not. Likewise, this magnetic force may resist contact between the bodies 510 and the lip 500 unless the angular velocity of the sleeve 502 is sufficiently great so as to cause the centrifugal force to overcome the magnetic force.

In some embodiments, the fishing reel 100 may include a clicking mechanism. The clicking mechanism provides a "clicking" sound when engaged. In that regard, the clicking mechanism may include a switch 162, a rotating arm 164 coupled to the spool shaft 122, and a movable finger 166. The movable finger 166 may be moved relative to the rotating arm 164 via the switch 162. In particular, the movable finger 166 may have a first position in which the arm 164 contacts the movable finger 166 at each revolution of the spool shaft 122, and a second position in which the arm 164 fails to contact the movable finger 166 at each revolution. The switch 162 may move the movable finger 166 between the first position and the second position. In response to contact between the arm 164 and the movable finger 166, a "click," "pop," or other sound is made. This allows an angler to troll or otherwise leave the fishing reel 100 unattended and to be alerted when a fish becomes hooked and takes fishing line (as it causes multiple revolutions of the spool shaft 122 as it takes line, causing multiple audible "clicks" or "pops" from the movable finger 166 and arm 164). In some embodiments, the clicking mechanism may include any other configuration such as a plurality of protrusions jutting radially outward relative to the spool shaft 122 that engages with the movable finger 166 such that contact between the movable finger 166 and each protrusion generates a "click" or "pop" sound.

Where used throughout the specification and the claims, "at least one of A or B" and "at least one of A and B" each include any of "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A fishing reel comprising:
   a spool having a spool shaft and configured to receive fishing line and to rotate about a first axis;
   a spool gear configured to be coupled to the spool shaft and to rotate with the spool shaft;
   a drag gear configured to interface with the spool gear;
   a main shaft configured to rotate about a second axis;
   a main shaft bearing configured to be positioned about the main shaft; and
   a plurality of friction washers including at least one drag washer configured to interface with and rotate with the drag gear, and at least one shaft washer configured to interface with and rotate with the main shaft, at least one of the plurality of friction washers being positioned radially outward from the main shaft bearing such that the at least one of the plurality of friction washers is free to rotate relative to the main shaft via the main shaft bearing and such that the main shaft bearing is located radially between the at least one of the plurality of friction washers and the main shaft.

2. The fishing reel of claim 1, wherein the plurality of friction washers includes a first plurality of friction washers located on a first side of the drag gear and a second plurality of friction washers located on a second side of the drag gear.

3. The fishing reel of claim 1, wherein the at least one of the plurality of friction washers includes a floating friction washer located adjacent to the drag gear and located radially outward from the main shaft bearing.

4. The fishing reel of claim 1, wherein the at least one shaft washer includes a first shaft washer and a second shaft washer such that the first shaft washer is located closer to the drag gear along the second axis than the second shaft washer, and wherein the first shaft washer and the second shaft washer are each configured to interface with and rotate with the main shaft.

5. The fishing reel of claim 4, wherein the first shaft washer defines a counterbore configured to receive the main shaft bearing and an engagement feature configured to interface with the main shaft, the counterbore being located axially closer to the drag gear than the engagement feature.

6. The fishing reel of claim 1, wherein the at least one drag washer includes a first drag washer configured to be located radially outward from the main shaft bearing and to float relative to the drag gear, and a second drag washer spaced from the first drag washer by at least one of the at least one shaft washer and configured to interface with the drag gear.

7. The fishing reel of claim 6, further comprising a star gear lever configured to be actuated to compress or decompress the plurality of friction washers and the drag gear to increase or decrease, respectively, drag applied to the spool shaft via the friction between the plurality of friction washers, the interface between the second drag washer and the drag gear, the interface between the at least one shaft washer and the main shaft, and the interface between the drag gear and the spool gear.

8. The fishing reel of claim 1, further comprising a spool bearing configured to be located radially outward from and contact the spool gear and to facilitate rotation of the spool gear relative to a static structure of the fishing reel.

9. The fishing reel of claim 1, further comprising a cast control mechanism, wherein the spool has a first end and a second end that is located closer to the plurality of friction washers than the first end, and wherein the cast control mechanism is located closer to the second end of the spool than the first end of the spool.

10. The fishing reel of claim 9, wherein the cast control mechanism includes: an inner plate located between the spool and the plurality of friction washers;
    a sleeve at least partially located radially inward relative to the inner plate and rotatably coupled to the spool shaft;
    a pin extending at least partially between the inner plate and the sleeve in a radial direction; and
    a body defining an opening configured to at least partially receive the pin such that centrifugal force resulting from rotation of the spool shaft urges the body radially along the pin towards the inner plate.

11. A fishing reel comprising:
    a casing;
    a spool having a spool shaft and configured to receive fishing line and to rotate about a first axis;
    a spool gear configured to be coupled to the spool shaft and to rotate with the spool shaft;
    a spool bearing configured to be located radially outward from and contact the spool gear and to facilitate rotation of the spool gear relative to the casing; a drag gear configured to interface with the spool gear; a main shaft configured to rotate about a second axis;
    a main shaft bearing configured to be positioned about the main shaft; and
    a plurality of friction washers including at least one drag washer configured to interface with and rotate with the drag gear, and at least one shaft washer configured to interface with and rotate with the main shaft, the plurality of friction washers providing drag for the fishing reel,
    wherein the main shaft bearing is located radially between at least one of the plurality of friction washers and the main shaft such that the at least one of the plurality of friction washers is free to rotate relative to the main shaft via the main shaft bearing.

12. The fishing reel of claim 11, wherein the spool gear has a first axial end and a second axial end, and wherein the spool bearing includes a first spool bearing and a second spool bearing such that the first spool bearing is located closer to the first axial end of the spool gear than the second spool bearing and the second spool bearing is located closer to the second axial end of the spool gear than the first spool bearing.

13. The fishing reel of claim 12, further comprising a side plate defining an exposed portion of the fishing reel and an inner plate located between the spool and the plurality of friction washers, wherein the first spool bearing is configured to be located radially between the side plate and the spool gear and the second spool bearing is configured to be located radially between the inner plate and the spool gear.

14. The fishing reel of claim 12, wherein the spool gear is configured to interface with the drag gear at a location between the first spool bearing and the second spool bearing.

15. The fishing reel of claim 11, further comprising a star gear lever configured to be actuated to compress or decompress the plurality of friction washers and the drag gear to increase or decrease, respectively, drag applied to the spool shaft.

16. A fishing reel comprising: a casing;
a spool having a spool shaft and configured to receive fishing line and to rotate about a first axis, the spool further including a first end and a second end;
a spool gear configured to be coupled to the spool shaft and to rotate with the spool shaft;
a drag gear configured to interface with the spool gear;
a main shaft configured to rotate about a second axis;
a main shaft bearing configured to be positioned about the main shaft;
a plurality of friction washers located closer to the second end of the spool than the first end of the spool, the plurality of friction washers including at least one drag washer configured to interface with and rotate with the drag gear, at least one shaft washer configured to interface with and rotate with the main shaft, and at least one of the plurality of friction washers being positioned radially outward from the main shaft bearing such that the at least one of the plurality of friction washers is free to rotate relative to the main shaft via the main shaft bearing, the plurality of friction washers providing drag for the fishing reel;
a cast control mechanism located closer to the second end of the spool than the first end of the spool,
wherein the at least one of the plurality of friction washers includes a floating friction washer located adjacent to the drag gear and located radially outward from the main shaft bearing.

17. The fishing reel of claim 16, wherein the cast control mechanism further includes:
an inner plate located between the spool and the plurality of friction washers;
a sleeve at least partially located radially inward relative to the inner plate and rotatably coupled to the spool shaft;
at least one pin extending at least partially between the inner plate and the sleeve in a radial direction; and
at least one body defining an opening configured to at least partially receive the at least one pin such that centrifugal force resulting from rotation of the spool shaft urges the at least one body radially along the at least one pin towards the inner plate.

18. The fishing reel of claim 17, wherein the at least one pin includes a plurality of pins evenly spaced around a circumference of the sleeve, and the at least one body includes a plurality of bodies each of which being coupled with a respective pin of the plurality of pins.

19. The fishing reel of claim 18, wherein each of the plurality of pins is coupled to and extends radially away from the sleeve.

20. The fishing reel of claim 16, further comprising a spool bearing configured to be located between the spool gear and the inner plate.

* * * * *